(12) United States Patent
Westover

(10) Patent No.: US 8,015,745 B2
(45) Date of Patent: Sep. 13, 2011

(54) TRAPPED AIR STRIKE INDICATOR AND FLY

(76) Inventor: Brian Spencer Westover, Pleasant Grove, UT (US)

( * ) Notice: Subject to any disclaimer, the term of this patent is extended or adjusted under 35 U.S.C. 154(b) by 0 days.

(21) Appl. No.: 11/894,480

(22) Filed: Aug. 21, 2007

(65) Prior Publication Data
US 2009/0049735 A1    Feb. 26, 2009

(51) Int. Cl.
*A01K 93/00* (2006.01)
(52) U.S. Cl. .............. 43/17; 43/44.87; 43/43.1
(58) Field of Classification Search ........... 43/44.87, 43/43.1, 17; *A01K 93/00*
See application file for complete search history.

(56) References Cited

U.S. PATENT DOCUMENTS

| 849,367 | A | * | 4/1907 | Burke | 43/42.22 |
| 2,049,789 | A | * | 8/1936 | Webster | 43/43.1 |
| 2,731,758 | A | * | 1/1956 | Coe | 43/42.72 |
| 2,753,650 | A | * | 7/1956 | Rentz et al. | 43/42.33 |
| 2,958,976 | A | * | 11/1960 | Adams | 43/43.12 |
| 3,462,870 | A | * | 8/1969 | Terilli | 43/4 |
| 3,514,358 | A | * | 5/1970 | Barton et al. | 156/61 |
| 4,134,224 | A | * | 1/1979 | Clark | 43/42.05 |
| 4,194,936 | A | * | 3/1980 | Martuch | 156/67 |
| 4,794,720 | A | * | 1/1989 | Robertaccio | 43/42 |
| 4,864,767 | A | * | 9/1989 | Drosdak | 43/43.1 |
| 5,258,851 | A | * | 11/1993 | Yamaguchi | 386/20 |
| 5,279,066 | A | * | 1/1994 | Camera | 43/43.1 |
| 5,398,940 | A | * | 3/1995 | Derst, III | 473/430 |
| 5,625,976 | A | * | 5/1997 | Goodale | 43/44.98 |
| 7,003,911 | B2 | | 2/2006 | Schoenike | |
| 2008/0034640 | A1 | * | 2/2008 | Naerheim et al. | 43/44.92 |

OTHER PUBLICATIONS

Sierra Pacific Products website, http://www.sierrapac.com/terminal_tac.htm, available at least as early as Aug. 17, 2007.

\* cited by examiner

*Primary Examiner* — Kimberly Smith
*Assistant Examiner* — Marisa Conlon
(74) *Attorney, Agent, or Firm* — Clayton, Howarth & Cannon, P.C.

(57) ABSTRACT

A fishing device for indicating a lure strike from fishes is disclosed. The device may be a strike indicator that may include a hollow body filled with trapped air, where the strike indicator includes a tab having an opening formed therein and a grommet made from a hard, durable material seated in the opening. Alternatively, the device may be a fishing lure that may be attachable to a fishing hook and having a hollow body filled with trapped air and an attachment mechanism for attaching the lure to the fishing leader and/or fishing line. For example, the fishing lure may be a fishing fly having a hollow body filled with trapped air. In either embodiment, the device may be made from a lightweight, resilient material, for example ethylene vinyl acetate or other similar thermoplastic material. Further, in either embodiment, the hollow body may be substantially sealed with a substantially water tight seal without any inlet or outlet to the hollow body, such that substantially no liquid can displace the trapped air.

3 Claims, 3 Drawing Sheets

TRAPPED AIR STRIKE INDICATOR AND FLY

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

1. The Field of the Invention

The present disclosure relates generally to fishing devices and implements, and more particularly, but not necessarily entirely, to strike indicators and devices for setting fish hooks.

2. Description of Related Art

In fly fishing, a small substantially weightless hooked lure which resembles a fly or other bug is cast into the water. Normally the lure is attached to a monofilament "leader" which is virtually transparent in the water. The leader is attached to a line, which is usually opaque. For most species of fish, the fly fisherman uses either a surface-type fly or one that swims underwater. Disregarding trout flies, for the moment, most other flies used to take fish in salt and fresh water fall into two categories: Popping bugs that sit on the surface and are designed to make noise, and streamers which are underwater flies and are designed to imitate baitfish or leeches. Among the most popular surface-type flies for trout are conventional dry flies, terrestrial, thorax, paradun, parachute, Griffin's Gnat style, no-hackle, spinner, Renegade or fore and aft style, skater, variant, caddis and stonefly. Underwater flies for trout include wet flies, nymphs, soft hackle flies and streamers.

When a lure is cast into the water, a fish may attack the lure for a variety of reasons including instinct, anger or hunger, during which time an angler has an opportunity to set the hook. If the lure floats unnaturally in the water or if the line or lure makes a big splash, the fish may be spooked and seek cover, avoiding the lure. Assuming that the fish attacks the lure, for the angler to hook the fish he must know that it is mouthing the lure. If the angler is using a surface-type fly, the line, leader and fly are all on the surface of the water and it is easier for the angler to make a strike at the appropriate moment. It is for this reason that most people prefer dry fly fishing for trout.

Trout and many other fish, however, feed underwater nearly all of the time and are more likely to be taken on a lure that swims under the water. Knowing when a fish has taken a wet fly, nymph or the like is traditionally done by feel and takes a great deal of training to perfect. When an underwater fly is used in fly-fishing, the strike of a fish is often difficult to detect. Recently, fly-fishermen have begun using strike indicators attached to the leaders of their fly lines to better detect when a fish strikes their fly.

Typically, a fly is cast upstream and is fished back downstream to the fisherman. The fly typically moves naturally with the current downstream towards the fisherman. The fisherman often utilizes a floating strike indicator to help track the progress of the fly downstream. If a fish bites or eats the fly, motion will be imparted on the strike indicator that is inconsistent with the current. For example, the strike indicator may be pulled underwater by the fish, or the strike indicator may move upstream instead of downstream, or it may move cross-current, etc. When the fisherman notices this inconsistent movement; the fisherman will attempt to quickly set the hook embedded in the fly (or other lure) through a quick movement or manipulation of the fishing pole. The fisherman must attempt to set the hook very quickly in the mouth of the fish or risk giving the fish time to determine that the lure is a hook or other fishing device, whereby the fish would allow the fly to move out of its mouth.

Strike indicators attempt to signal the moment that the fly has been eaten by the fish. The fisherman must maintain a balance between letting the fly float naturally with the current and keeping the line taught enough to deliver a quick, sharp hook set. Beginning fly-fishermen find this very difficult and experienced fly-fishermen never fully master the technique.

Thus, strike indicators are known in the fly fishing industry. There are a number of different indicators. For example, a convenient strike indicator is known commercially as a "stick on" closed-cell dumb bell-shaped pad. The pads have a contact glue back and are prepunched on a rectangular sheet. Individual pads are simply peeled off and pressed around the leader at the desired point. The pad has the advantage of relatively soft impact on the water, but it has a one-time use.

Another type of indicator is a tiny ball with a hole through the center, being in effect a small bobber. The leader is inserted in the hole and the ball is positioned on the leader. To keep it at the selected point, a toothpick is inserted between the hole and the leader and the excess toothpick is broken off. This type of float has the disadvantage of hitting the water with a fairly loud splash.

An indicator can be made from a small tube of closed-cell foam through which a heated wire is pushed. The leader is threaded through the hole and a small piece of yarn attached so that it protrudes from the top of the foam tube. When a fish pulls the foam tube under, the yarn comes to a vertical position. This indicator is very visible as the yarn alert makes the strike more noticeable. The indicator lands with a splash and is therefore disadvantageous.

Indicators can also be made from yarn treated with a silicone fly floatant. Sections of yarn are tied to the leader with the ends trimmed to keep the leader tippet from twisting. This indicator has the distinct advantage of being able to wind inside the guides, but it does not float as well as closed-cell foam indicators and it must be clipped off when the angler is done fishing, thereby destroying the indicator.

It is noteworthy that none of the devices known to applicant provides a trapped air device that is durable enough to be used over and over. There is a long felt, but currently unmet need, for a trapped air strike indicator and trapped air fly design that is inexpensive to make and simple in operation.

The known devices are thus characterized by several disadvantages that are addressed by the present disclosure. The present disclosure minimizes, and in some aspects eliminates, the above-mentioned failures, and other problems, by utilizing the structural features and methods described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
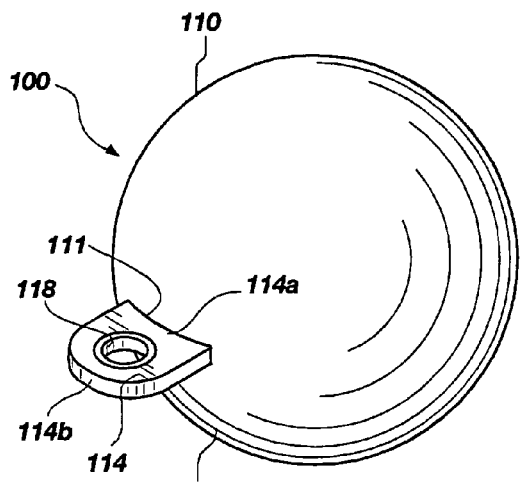
FIG. 1 is a perspective view of a trapped air strike indicator made in accordance with the principles of the present disclosure.
Figure 2:
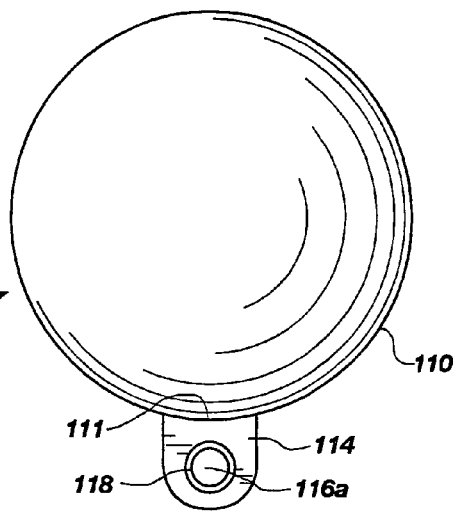
FIG. 2 is a front view of the trapped air strike indicator of FIG. 1 made in accordance with the principles of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present structural features and methods are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

In describing and claiming the present disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

Referring now to FIGS. 1-4 and 8-10, the present disclosure relates to a fishing device 100 and more specifically to a trapped air strike indicator 102 and a trapped air fishing lure 202, such as a fishing fly, used in fly fishing.

An embodiment of a trapped air strike indicator 102 is illustrated in FIGS. 1-4 and may comprise a body 110 that may include a hollow interior 112. The hollow body 110 may be filled with trapped air such that the strike indicator 102 may float on top of water or other liquid. The hollow body 110 may include an outer surface 110a and inner surface 110b with a thickness T of the hollow body 110 being defined by the amount of material present between the outer surface 110a and the inner surface 110b.

In order to provide an appropriate balance between durability and floatation, the strike indicator 102 may be manufactured from a lightweight, durable material having a sufficient thickness T to be durable. For example, the lightweight material may be a lightweight thermoplastic material and may advantageously provide the avoidance of a big splash as the fishing lure is cast into the water, thereby avoiding the problem of spooking the fish due to the big splash. Further, big splashes may be avoided because the lightweight material may be supple, such that the material may aid in absorbing at least some of the force associated with casting a fishing lure and strike indicator 102 into a river, stream or other water area.

It will be appreciated that any lightweight material may be utilized by the present disclosure without departing from the spirit or scope of the present disclosure. However, it has been found advantageous to use one of the following lightweight materials, including, but not limited to, thermoplastic elastomers, also known as TPEs, and vinyl acetate copolymers, for example ethylene vinyl acetate (also known as EVA). It will be appreciated that the fishing device 100 generally, and the strike indicator 102 and the trapped air fishing lure 202 of the present disclosure, may be manufactured from any family of polymers that can be elastically deformed, meaning that the material may be repeatedly stretched or otherwise misshaped without permanently deforming the shape of the part. It will be appreciated that due to the lightweight material from which the hollow body 110 may be manufactured, the hollow body 110 may be resilient, such that the hollow body 110 may deform under pressure and then may return to its original shape when the pressure is removed.

Thermoplastic elastomers (TPEs) may be processed by conventional thermoplastic techniques such as injection molding, extrusion and blow molding. It will be appreciated that there are several main thermoplastic elastomer groups found commercially, for example: styrenic block copolymers, polyolefin blends (TPOs), elastomeric alloys, thermoplastic polyurethanes (TPUs), thermoplastic copolyesters and thermoplastic polyamides.

Vinyl acetate copolymers, such as ethylene vinyl acetate, are commercially available from various commercial sources. For example, DuPont manufactures ethylene vinyl acetate under the brand name ELVAX®. It will be appreciated that the lightweight material used to manufacture the fishing device 100 of the present disclosure may also have good resistance to water, which may be advantageous for the intended use of the strike indicator 102 or trapped air fishing lure 202. It will be appreciated that because vinyl acetate copolymers, such as EVA, are thermoplastics, they can be easily molded by extrusion, injection, blow molding, and rotational molding.

Referring to FIGS. 1-4 and 8-10, it will be appreciated that the body 110 of the fishing device 100, whether the strike indicator 102 or the trapped air fishing lure 202, may be substantially sealed with a water tight seal. In other words, there may be no inlet or outlet into the hollow body 110, such that substantially no liquid can enter the hollow body 110 to displace the trapped air inside the hollow body 110. It will be appreciated that any type of water tight seal to trap air inside a substantially hollow body 110 may be utilized by the present disclosure and all such seals are meant to fall within the scope of the present disclosure.

Figure 3:
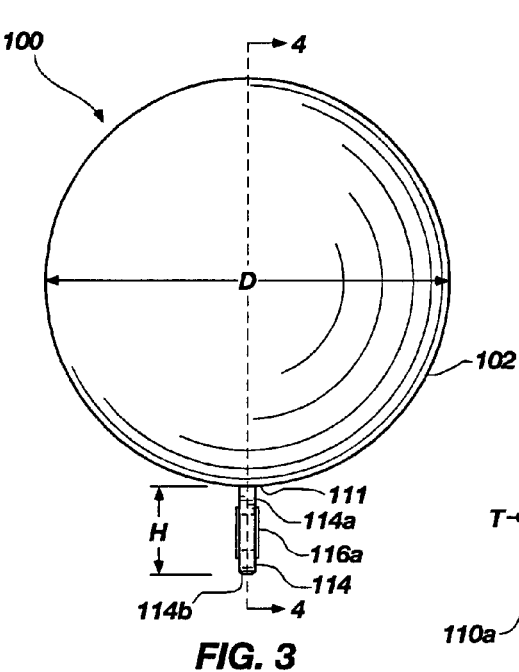
FIG. 3 is a side view of the trapped air strike indicator of FIG. 1 made in accordance with the principles of the present disclosure.
Figure 4:
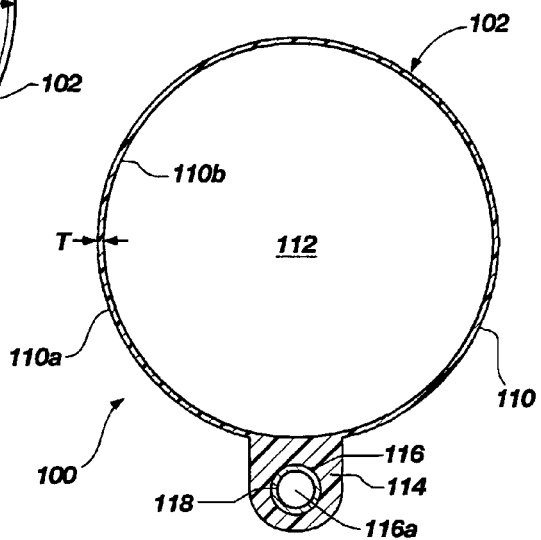
FIG. 4 is a cross sectional view of the trapped air strike indicator taken along the line 4-4 in FIG. 3.

Referring specifically to FIGS. 1-4, the strike indicator 102 may comprise a tab 114 that may be attached to and may extend from the hollow body 110. It will be appreciated that the tab 114 may be formed integrally with the hollow body 110 in a unitary piece with the hollow body 110 as illustrated in FIG. 4. The tab 114 may include a sidewall 116 that may define an opening 116a, which may be formed through the tab 114.

In another embodiment, a grommet 118 may be seated in the opening 116a and may matingly engage the sidewall 116 defining the opening 116a in the tab 114. It will be appreciated that the grommet 118 may be manufactured from a hard material to thereby protect the opening 116a of the tab 114 of the strike indicator 102 from substantial damage due to forces that may be placed on the tab 114 by a fishing leader 150, which may be attached to a floating fishing line 140, that may extend through the opening 116a to be attached to the tab 114 (illustrated best in FIGS. 5-7). For example, the grommet 118 may be manufactured from a metallic material, a hardened plastic material or any other hardened material with sufficient durability to keep the tab 114 from tearing due to the forces of the fishing line 140 without departing from the spirit or scope of the present disclosure.

It is to be understood that the hollow body 110 may be shaped in various configurations without departing from the scope of the present disclosure. For example, the hollow body may be substantially circular, oval, bell-shaped, tubular, football shaped, an elongated shape or any other shape. It will be appreciated that, despite the shape, the hollow body 110 may include a diameter D, which may be defined as the length of a straight line that extends from one edge of the hollow body 110, through its center and to the opposite edge of the hollow body 110.

As illustrated in FIG. 3, the diameter D of the strike indicator 102 may deform in one dimension within a range of about five percent to about thirty percent as one pound of pressure is applied to the hollow body 110. In other words, as one pound of pressure is applied to the outside surface 110a of the hollow body, or as pressure is applied externally with respect to the hollow body 110, a dimension, which may be the diameter D, of the strike indicator 102 or fishing lure 202 may decrease in magnitude. Such a dimension may be measured in a substantially vertical manner or in a direction that is parallel to the vector of force applied externally to the hollow body 110.

For example, the diameter D of the hollow body 110 of the strike indicator 102, or the trapped air fishing lure 202, may deform in one dimension within a range of about twelve percent to about twenty-three percent or within a range of about fifteen percent to about twenty percent as one pound of pressure is applied to the hollow body 110. It will be appreciated that all values between the above ranges fall within the scope of the present disclosure.

The tab 114 may comprise a height H, which may be measured from a base 114a of the tab 114 to a terminal end 114b of the tab 114 as illustrated in FIG. 3. The height H of the tab 114 may be defined as a dimension measured from a surface 111 of the hollow body 110 to which the base 114a of the tab 114 may be attached and from which the tab 114 may extend to the terminal end 114b of the tab 114, which may be located directly opposite the surface 111 of the hollow body 110 from which the tab 114 may be attached and from which the tab 114 may extend. It will be appreciated that there may be a proportional relationship between the height H of the tab 114 and the diameter D of the hollow body 110. For example, the height H of the tab 114 may be within a range of about fifteen percent to about thirty-five percent of the diameter D of the hollow body 110. It will be appreciated that all angles within the specified range fall within the scope of the present disclosure. For example, the height H of the tab 114 may be within a range of about twenty percent to about thirty percent of the diameter D of the hollow body 110 without departing from the scope of the present disclosure.

Figure 8:
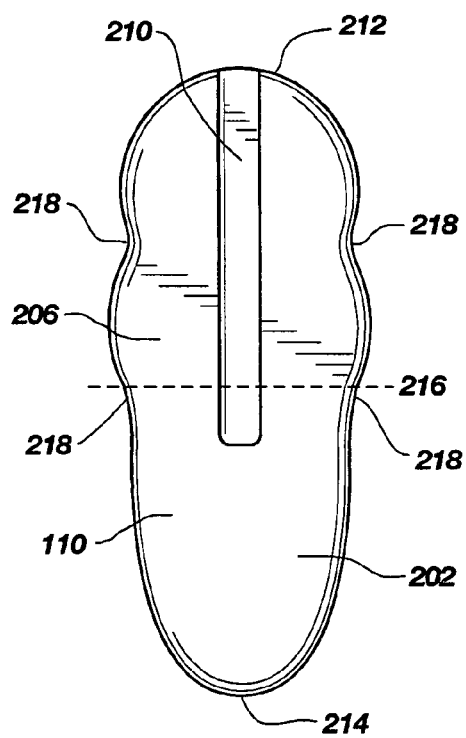
FIG. 8 is a bottom view of another trapped air device in the form of a fishing lure that may be tied into a fishing fly made in accordance with the principles of the present disclosure.
Figure 9:
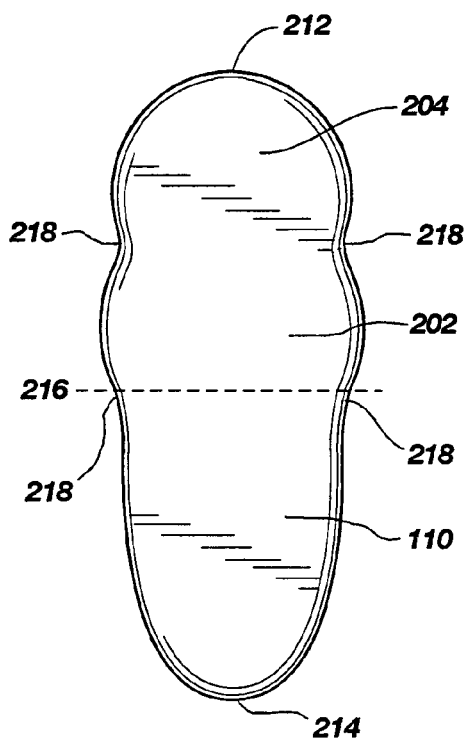
FIG. 9 is a top view of the trapped air device of FIG. 8 made in accordance with the principles of the present disclosure.
Figure 10:
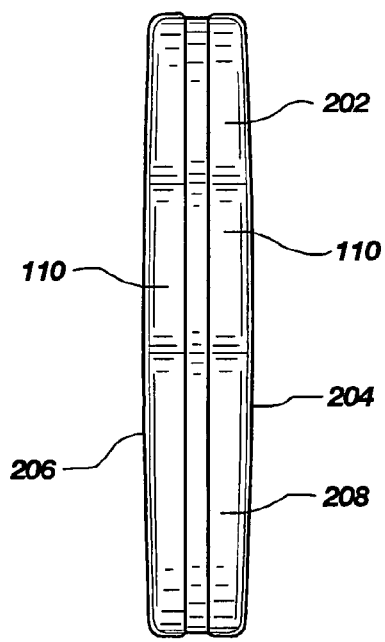
FIG. 10 is a side view of the trapped air device of FIG. 8 made in accordance with the principles of the present disclosure.

Referring now to FIGS. 8-10, it will be appreciated that the hollow body 110 may be part of a trapped air fishing lure 202. The trapped air fishing lure 202 may comprise all of the structural components, aspects and advantageous features disclosed above in connection with the trapped air strike indicator 102. Further, the trapped air fishing lure 202 maybe utilized as a base for tying various types of fishing flies. In other words, an angler may use the trapped air fishing lure 202 as the starting point when tying any type of fishing fly. Thus, the trapped air fishing lure 202 may be any profile for creating a certain type of bug, such that the shape is determined, not by necessarily by the profile of the fishing lure 202, but by the tying of the fly. Thus, the shape or profile of the fishing lure 202 may be any shape that is representative of a fishing fly of any type or form. Thus, the trapped air fishing lure 202 may be manufactured in various shapes, such as that illustrated in FIGS. 8-10 or it may be shaped in a circular, bell-shaped, tubular, football shaped, oval shaped, or any other elongated shape without departing from the spirit or scope of the present disclosure.

The fishing lure 202 may include a top surface 204 and a bottom surface 206 with a sidewall 208 connecting the top 204 and bottom 206 surfaces. The fishing lure 202 may also include a front end 212 and a back end 214. A groove 210 may be formed in the bottom surface 206 and may extend from the terminal front end 212 toward the back end 214 and may terminate at about a mid-portion 216 of the bottom surface 206 as illustrated best in FIG. 8. It will be appreciated that the groove 210 may terminate at the midpoint 216, before the midpoint 216, or after the midpoint 216 without departing from the spirit of scope of the present disclosure. The groove 210 may be configured and dimensioned to accept a fish hook, such that the width and length of the groove correspond with the fish hook.

The trapped air fishing lure 202 may include at least one, and advantageously a plurality of, notches 218 for receiving thread or other material for tying a fly. Once again, the shape of the fishing lure 202 may be any shape since the type of fly may be determined by how a user ties a fly and the colors, shapes and textures chosen during the fly tying process. Thus, the fishing lure 202 may include provide a hollow body 110, having a hollow interior similar to hollow interior 112, that may substantially trap and seal air in the hollow body 110 and attached to a fish hook to form a fishing fly. The fishing lure 202 may thus be a fishing fly having a hollow body filled with trapped air.

The fishing device 100 may also include a floating fishing line 140 that may be used in combination with the strike indicator 102 or trapped air fishing lure 202 to indicate when a fish strikes a fishing lure that may be attached to an end of the floating fishing line 140. It will be appreciated that the floating fishing line 140 may be attachable to the fishing leader 150, and wherein the strike indicator 102 or the trapped air fishing lure 202 may be attachable to the fishing leader 150. Floating fishing lines 140 and fishing leaders 150 are well known in the fishing industry and any such floating line or fishing leader may be utilized by the present disclosure without departing from the spirit or scope of the present disclosure. For example, it will be appreciated that the fishing leader 150 may or may not be tapered without departing from the scope of the present disclosure. It will be appreciated that the strike indicator 102 or the trapped air fishing lure 202 may be directly attachable to the fishing leader 150.

Figure 5:
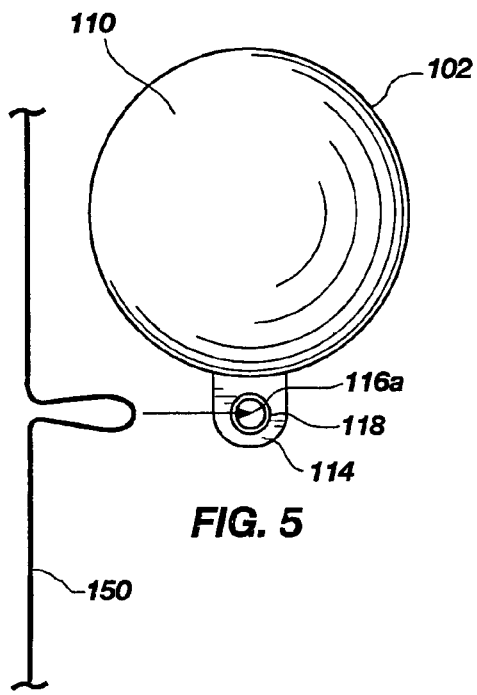
FIGS. 5 through 7 are side views of the trapped air strike indicator of FIG. 1 illustrating the method of floating a fishing line using the trapped air strike indicator.
Figure 6:
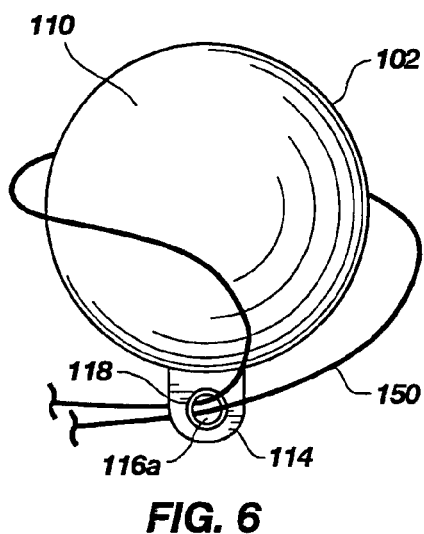
Figure 7:
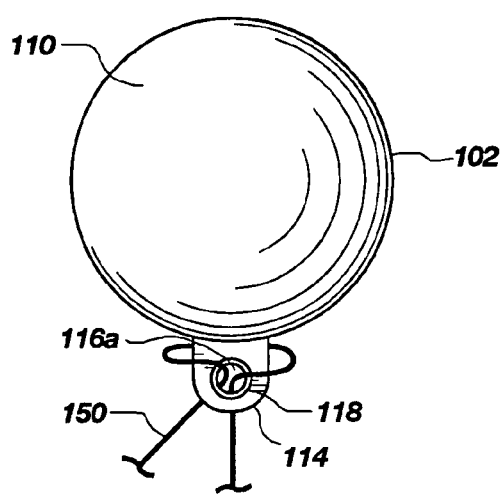

In accordance with the features and combinations described above, a useful method of floating a fishing line is illustrated in FIGS. 5-7 and may include the steps of:

(a) providing a hollow body trapped with air inside the hollow body, wherein the hollow body may be substantially sealed with a water tight seal having no inlet or outlet into the hollow body, such that substantially no liquid can enter the hollow body to displace the trapped air inside the hollow body;

(b) attaching the hollow body to a fishing line, thereby providing an element of floatation to the fishing line.

Other Steps in the Method May Include:

(c) attaching a leader to the fishing line and directly attaching the hollow body to the leader;

(d) wherein the step of attaching the hollow body to the fishing line may include forming a loop in the fishing leader and inserting the loop through the opening in the tab, such that the fishing leader has two free portions that remain on a side of the opening that is opposite the loop; and (e) wherein the step of attaching the hollow body to the fishing line may further include pulling the loop around the hollow body and pulling the two free portions of the fishing leader taut, thereby firmly attaching the hollow body to said fishing leader, which may be attached to the fishing line.

Those having ordinary skill in the relevant art will appreciate the advantages provided by the features of the present disclosure. For example, it is a potential feature of the present disclosure to provide a trapped air strike indicator or a trapped air fishing lure that is simple in design and in manufacture. Another potential feature of the present disclosure may be to provide such a trapped air strike indicator or fishing lure having a body with a hollow interior that may be substantially sealed, such that substantially no water can flow in or out of the hollow interior. It is yet another potential feature of the present disclosure, in accordance with one aspect thereof, to provide a trapped air fishing lure that may be attached to a fishing hook for being tied into a fishing fly.

In the foregoing Detailed Description of the Disclosure, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A buoyant strike indicating fly fishing device for use with a floating fly fishing line and a fly fishing rod and reel, comprising:
   a first portion consisting of a substantially spherical permanently sealed hollow body and a fluid;
   wherein said fluid is permanently sealed within said hollow body;
   a second portion comprising a protrusion;
   wherein said protrusion comprises an opening therein for mechanically interfacing with fly fishing line;
   wherein said second portion extends out from said first portion;
   wherein said first portion and said second portion form a unitary structure and are formed from a single material;
   wherein said single material is a polymeric material capable of being temporarily deformed by impacting water such that impact energy is dissipated by said deformation;
   a structure disposed in said opening that is made of a material that is harder than the material making up said first and second portions; and
   wherein said structure is matingly engaged with said opening so as to be retained therein.

2. A buoyant strike indicating fly fishing device for use with a floating fly fishing line and a fly fishing rod and reel, consisting of:
   a first portion having a substantially spherical permanently sealed hollow body and a fluid, wherein said fluid is sealed within said hollow body;
   wherein said first portion is manufactured without an inlet into and without an outlet from the hollow body, such that no liquid can enter an interior portion of said hollow body to displace the fluid inside said hollow body; and
   a second portion having a protrusion with an opening defined by a sidewall formed therein;
   wherein said opening in said protrusion allows for mechanical interfacing with fly fishing line;
   wherein said second portion extends out from said first portion;
   wherein said first portion and said second portion form a unitary structure and are formed from a single material;
   wherein said single material is a polymeric material capable of being temporarily deformed by impacting water, such that impact energy is dissipated by said deformation;
   a structural grommet member disposed in said opening that is made of a material that is harder than the polymeric material making up said first portion and said second portion, to thereby protect said opening from substantial damage due to forces experienced by said second portion;
   wherein said structural grommet member has an inner wall, and an outer wall that is matingly engaged with the sidewall defining said opening so that the structural grommet member is retained therein, thereby causing the polymeric material of the protrusion to envelop the outer wall of said structural grommet member;
   wherein a diameter of the hollow body of the strike indicator deforms in one dimension within a range of about five percent to about thirty percent at one pound of pressure;

wherein the second portion has a height that is within a range of about fifteen percent to about thirty-five percent of the diameter of the hollow body; and wherein the hollow body is resilient, such that the hollow body deforms under pressure and then returns to its original shape when the pressure is removed.

3. A system for indicating when a fish strikes a fishing fly, the system comprising:
- a fly fishing rod;
- a fly fishing reel;
- a fly line comprising a core to provide tensile strength and a coating, wherein the core provides a foundation to which the coating attaches to provide weight to the fly fishing line, such that the weight of the fly fishing line causes a bend in the fly fishing rod during a fly fishing cast;
- a fly fishing leader;
- a fishing fly; and
- a strike indicating fly fishing device, consisting of:
  - a first portion having a substantially spherical permanently sealed hollow body and a fluid, wherein said fluid is sealed within said hollow body;
  - wherein said first portion is manufactured without an inlet into the hollow body and without an outlet from the hollow body, such that no liquid can enter an interior portion of said hollow body to displace the fluid inside said hollow body;
  - a second portion having a protrusion with an opening defined by a sidewall formed therein;
  - wherein said opening in said protrusion allows for mechanical interfacing with the fly fishing leader;
  - wherein said second portion extends out from said first portion;
  - wherein said first portion and said second portion form a unitary structure and are formed from a single material;
  - wherein said single material is a polymeric material;
  - wherein a diameter of the hollow body deforms in one dimension within a range of about five percent to about thirty percent at one pound of pressure;
  - a structural grommet member disposed in said opening, which is made of a material that is harder than the polymeric material making up said first portion and said second portion, to thereby protect said opening from substantial damage due to forces experienced by said second portion;
  - wherein said structural grommet member has an inner wall, and an outer wall that is matingly engaged with the sidewall defining said opening so that the structural grommet member is retained therein, thereby causing the polymeric material of the protrusion to envelop the outer wall of said structural grommet member;
  - wherein the second portion has a height that is within a range of about fifteen percent to about thirty-five percent of the diameter of the hollow body; and
  - wherein the hollow body is resilient, such that the hollow body deforms under pressure and then returns to its original shape when the pressure is removed.

* * * * *